United States Patent
Van der Voort et al.

[11] Patent Number: 5,994,831
[45] Date of Patent: Nov. 30, 1999

[54] LOW-PRESSURE MERCURY DISCHARGE LAMP WITH LUMINESCENT LAYER

[75] Inventors: Dick Van der Voort, Eindhoven; Henricus C. G. Verhaar, Turnhout; Jan W. F. Dorleijn, Roosendaal, all of Netherlands

[73] Assignee: U.S. Philips Corporation, New York, N.Y.

[21] Appl. No.: 08/920,752

[22] Filed: Aug. 29, 1997

[51] Int. Cl.⁶ ..................................................... H01J 61/44
[52] U.S. Cl. ........................................... 313/486; 313/487
[58] Field of Search .................................... 313/486, 487, 313/639, 640, 485; 427/64, 67, 126.3; 252/301.4 R

[56] References Cited

U.S. PATENT DOCUMENTS

| | | | |
|---|---|---|---|
| 3,937,998 | 2/1976 | Verstegen et al. | 313/487 |
| 4,075,532 | 2/1978 | Piper et al. | 313/497 |
| 4,085,350 | 4/1978 | Kagami et al. | 252/301.4 R |
| 4,335,330 | 6/1982 | Peters et al. | 313/486 |
| 4,857,741 | 8/1989 | Yokota et al. | 252/301.4 R |
| 4,946,621 | 8/1990 | Fouassier et al. | 252/301.4 R |

OTHER PUBLICATIONS

W.A. Thornton, Three Color Visual Response, J. Opt. Soc. Am. vol. 62, No. 3, pp. 457–459, Mar. 1972.

*Primary Examiner*—Sandra O'Shea
*Assistant Examiner*—Michael Day
*Attorney, Agent, or Firm*—F. Brice Faller

[57] ABSTRACT

A low-pressure mercury discharge lamp is provided with a discharge vessel (1) which encloses a discharge space (2) in a gastight manner and in which a filling including mercury is accommodated. The lamp is provided with means (3a, 3b) for maintaining an electric discharge in the discharge space. The discharge vessel is provided with a luminescent layer (5). The lamp generates light during operation with a spectrum which is substantially composed of radiation in a first wavelength region from 590 to 630 nm, a second wavelength region from 520 to 565 nm, and in a third wavelength region from 430 to 490 nm. The radiation in the wavelength interval from 590 to 600 nm accounts for at least 50% of the power of the radiation in the entire first wavelength region. A preferred embodiment of the lamp includes a luminescent material that complies with the formula $M1_xM2_{(1-x-y)}BO_3:Eu^{3+}{}_y$, in which M1 is an element from the group formed by Sc, In, and Lu, and in which M2 is an element from the group formed by Sc, Y, La, Gd, Ga, In, and Lu, where M1 is different from M2, with $0.01 \leq y \leq 0.2$, $x>0$, $x+y<1$, while the luminescent material has a calcite lattice structure.

6 Claims, 3 Drawing Sheets

LOW-PRESSURE MERCURY DISCHARGE LAMP WITH LUMINESCENT LAYER

BACKGROUND OF THE INVENTION

The invention relates to a low-pressure mercury discharge lamp provided with a discharge vessel which encloses a discharge space in a gastight manner and in which a filling comprising mercury is accommodated, and with means for maintaining an electric discharge in the discharge space. The discharge vessel is provided with a luminescent layer, generating light during operation with a spectrum which is substantially composed of radiation in a first wavelength region from 590 to 630 nm, in a second wavelength region from 520 to 565 nm, and in a third wavelength region from 430 to 490 nm.

Low-pressure mercury discharge lamps are widely used for general lighting purposes. The radiation generated in the discharge space is mainly ultraviolet radiation which is converted into visible radiation by the luminescent layer. The discharge may be maintained by electrodes between which a potential difference obtains and which may be arranged inside or outside the discharge space. Alternatively, the discharge may be maintained by means of a coil which generates a high-frequency magnetic field in the discharge space during operation, or the means for maintaining the discharge may be formed by a microwave generator.

Standard lamps are mostly used in surroundings where color rendering plays only a limited part, such as industrial lighting and street lighting, in which case the luminescent layer is composed of halophosphates such as calcium halophosphate activated by Sb and Mn. This is because of the low cost price of halophosphates. Such lamps have a mediocre color rendering (Ra=50 to 60) and a reasonable luminous efficacy ($\eta$=80 lm/W). Ra represents the general color rendering index as defined in CIE Publication No. 13, 1965, of the Commission Internationale de l'Eclairage.

Low-pressure mercury discharge lamps having a high luminous efficacy are disclosed in U.S. Pat. No. 4,075,532. The luminescent layer here has an emission spectrum with a narrow blue and a wide yellow emission band. A disadvantage of these lamps is that the color rendering is substantially worse than that of the standard lamps mentioned earlier.

W.A. Thornton, Three Color Visual Response, J. Opt. Soc. Am. Vol. 62, No. 3, 457–459, states that the spectral colors adjacent 450, 540, and 610 nm contribute most to the color perception and that on the contrary wavelengths adjacent 500 and 580 nm are unfavorable.

A lamp of the kind mentioned in the opening paragraph is known from U.S. Pat. No. 3,937,998. Luminescent materials activated by rare earth metals are used in the luminescent layer of this lamp on account of the generally comparatively narrow emission spectra of these materials. Emission in the wavelength region from 520 to 565 nm is generated here by means of aluminates activated by terbium. Furthermore, bariummagnesium aluminate activated by bivalent europium and various other luminescent materials suitable for emission in the wavelength region from 430 to 490 nm are mentioned therein. Yttrium oxide activated by trivalent europium, whose emission spectrum has a maximum at 611 nm and a half-value width of 2 nm, serves as a luminescent material here for emission in a wavelength region from 590 to 630 nm. Such light sources have a good color rendering (Ra$\approx$80) and a high luminous efficacy ($\eta\approx$90 lm/W).

It is noted that a luminescent material for the 430 to 490 nm wavelength region is not always necessary in lamps of this kind. The visible radiation emitted by the mercury discharge in that wavelength region forms a sufficient contribution especially in lamps whose emitted radiation has a low color temperature.

As described in U.S. Pat. No. 4,335,330 (Peters et al.), many of such luminescent materials activated by rare earth metals are suitable for lamps with high wall loads (>500 W/m$^2$), provided certain conditions are complied with.

A disadvantage, however, is the comparatively high cost price of luminescent materials activated by rare earth metals as compared with the standard lamps mentioned further above, which renders the known lamp unattractive in those applications where a mediocre color rendering can suffice.

SUMMARY OF THE INVENTION

According to the invention, the lamp of the kind described in the opening paragraph is the radiation in a wavelength interval from 590 to 600 nm accounts for a proportional power of at least 25% of the total power radiated in the entire first wavelength region.

A color rendering comparable to that of the standard lamps mentioned above is realized by means of the spectrum of the lamp according to the invention. The spectrum of the lamp according to the invention, however, has a visual efficiency which is considerably higher than that of the spectrum of the standard lamps and also higher than that of the spectrum of the lamps known from U.S. Pat. No. 3,937,998. The visual efficiency, expressed in lm/W, is understood to be the ratio of the brightness of radiation having a given spectrum as perceived by a human observer to the power of the radiation. The high visual efficiency means that the same lumen output is realized with a lower lamp power. This renders the of 590 to 630 nm wherein radiation in the interval of 590 to 600 nm accounts for at least 25% of the power; can be realized in that the luminescent layer for the emission of and an activator, which activator is formed by the Eu$^{3+}$ ion which is present in the host lattice in a location with inversion symmetry. Owing to the inversion symmetry in the host lattice, the $^5D_0\rightarrow{}^7F_1$ transition associated with emission in the 590 to 600 nm wavelength interval, in particular emission having a wavelength of approximately 595 nm, is strongly promoted over other transitions. Materials which comply with this are, for example: Ba$_2$YTaO$_6$:Eu$^{3+}$ or Gd$_{1-x-y}$Bi$_x$BO$_3$:Eu$^{3+}$$_y$, for example Gd$_{0.945}$Bi$_{0.005}$BO$_3$:Eu$^{3+}$$_{0.005}$.

A preferred embodiment of the lamp according to the invention is one in which the luminescent material complies with the formula

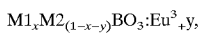

$$M1_xM2_{(1-x-y)}BO_3:Eu^{3+}{}_y,$$

in which M1 is an element from the group formed by Sc, In and Lu, and in which M2 is an element from the group formed by Sc, Y, La, Gd, Ga, In, and Lu, M1 being different from M2, with $0.01\leq y\leq 0.2$, $x>0$, $x+y<1$, while the luminescent material has the calcite lattice structure.

It was found that the calcite lattice structure can be obtained with a composition in which 0.061 nm$\leq x$*r(M1)+ (1−x−y)*r(M2)+y*r(EU$^{3+}$)$\leq$0.086 nm, in which r(M1), r(M2), and r(Eu$^{3+}$) are the respective radii of the trivalent cations of M1, M2, and Eu$^{3+}$.

A suitable choice of one or several of the above materials in addition renders it possible to vary the ratio of the power proportion of the radiation in the wavelength interval from 600 to 620 nm to the power proportion of the radiation in the wavelength interval from 590 to 600 nm within the wavelength region from 590 to 630 nm.

Favorable results were obtained with low-pressure mercury discharge lamps according to the invention in which the luminescent layers comprise one or several luminescent materials chosen from the group comprising:

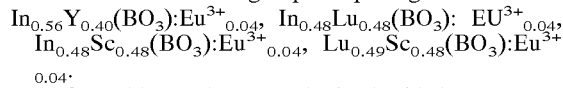
$In_{0.56}Y_{0.40}(BO_3):Eu^{3+}_{0.04}$, $In_{0.48}Lu_{0.48}(BO_3):EU^{3+}_{0.04}$, $In_{0.48}Sc_{0.48}(BO_3):Eu^{3+}_{0.04}$, $Lu_{0.49}Sc_{0.48}(BO_3):Eu^{3+}_{0.04}$.

Very favorable results were obtained with low-pressure mercury discharge lamps according to the invention in which M1 and M2 are formed by In and Gd, respectively.

If so desired, other luminescent materials which emit mainly in the wavelength interval from 600 to 620 nm may be added, for example yttrium oxide activated by $Eu^{3+}$. The ratio of the power proportion of the radiation in the wavelength interval from 600 to 620 nm to the power proportion of the radiation in the wavelength interval from 590 to 600 nm may be further influenced thereby. An attractive compromise between color rendering and effiency is realized when the power proportion of the radiation in the wavelength interval from 590 to 600 nm is at least 50%, and said ratio lies between 0.2 and 1.0.

It is possible for a single luminescent material to emit in two or more of said wavelength regions, for example, such a material comprising several activators. Alternatively, different luminescent materials may be used for the individual wavelength regions.

Emission in the second wavelength region may be realized, for example, with luminescent materials such as $Ce_{0.67}Tb_{0.33}MgAl_{11}O_{19}$ (CAT), $Ce_{0.3}Gd_{0.5}Tb_{0.2}MgB_5O_{10}$ (CBT) and $Ce_{0.45}La_{0.4}Tb_{0.15}PO_4$ (LAP).

In the cases of lamps having a comparatively low color temperature, the radiation in the third wavelength region may be entirely realized through direct emission from the mercury discharge, in particular the 436 nm line. This emission may be supplemented with emission from luminescent materials such as $(Ba,Ca)_{1.29}Al_{12}O_{19.29}:Eu^{2+}$ (BAL), $Sr_5(PO_4)_3Cl:Eu^{2+}$ (SCAP), $BaMgAl_{10}O_{17}:Eu^{2+}$ (BAM) and $Sr_2Al_6O_{11}:Eu_{2+}$ (SAL) in lamps having a higher color temperature.

Luminescent materials complying with the general formula $M1_xM2_{(1-x-y)}BO_3:Eu^{3+}_y$ suitable for use in the low-pressure mercury discharge lamp according to the invention may be prepared as follows. Oxides of M1 and M2 and europium oxide are mixed in a ratio corresponding to the desired composition of the luminescent material to be prepared. This mixture is milled and mixed with a molar quantity of boric acid which is approximately twice the total molar quantity of the M1, M2, and europium present in the mixture. The mixture of the oxides and the boric acid is then calcinated for 30 minutes at a temperature of 600° C. The resulting product is milled and calcinated for 24 hours at a temperature of 1250° C. After cooling down, the powder thus obtained is rinsed in cold water for two hours so as to remove any remaining boric acid. Then the powder is dried at 80° C.

DETAILED DESCRIPTION OF THE PREFERRED EMBODIMENTS

Figure 1:
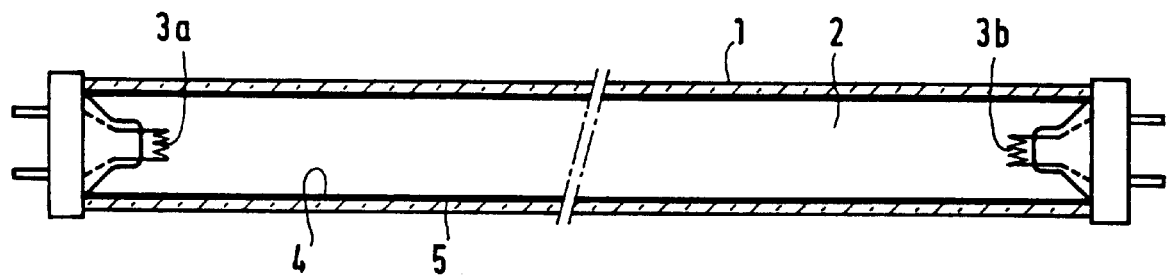
FIG. 1 shows a first embodiment of a low-pressure mercury discharge lamp.

FIG. 1 shows a low-pressure mercury discharge lamp which is provided with a discharge vessel 1 which encloses a discharge space 2 in a vacuumtight manner and in which a filling is accommodated comprising mercury and argon. The discharge vessel 1 here is a lime glass tube with an electrode 3a, 3b arranged therein at either end. The electrodes serve as means for maintaining an electric discharge in the discharge space 2. The discharge vessel 1 is provided with a luminescent layer 5 on an inner surface 4. The luminescent layer 5 of the lamp according to the invention comprises the luminescent materials $In_{0.835}Gd_{0.12}BO_3:Eu^{3+}_{0.045}$ (IBO), $Ce_{0.3}Gd_{0.5}Tb_{0.2}MgB_5O_{10}$ (CAT), and $BaMgAl_{10}O_7:Eu_{2+}$ (BAM). The first luminescent material has an emission spectrum which lies mainly in the first wavelength region from 590 to 630 nm. The emission spectrum of the second luminescent material lies mainly in the second wavelength region from 520 to 565 nm, while the emission spectrum of the third luminescent material lies mainly in the third wavelength region from 430 to 490 nm.

Figure 2A:
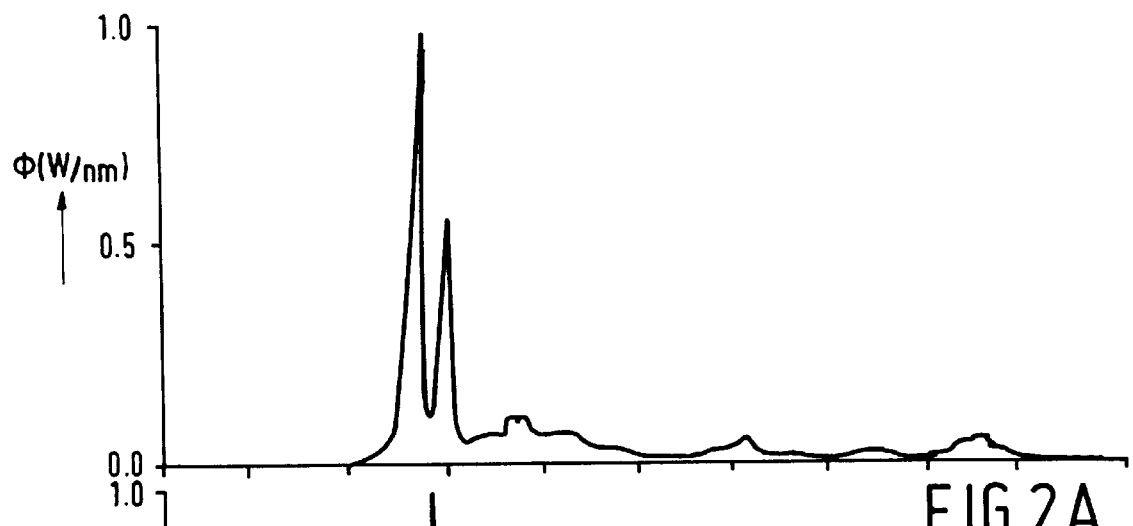
FIG. 2A shows the emission spectrum of a preferred luminescent material according to the invention.

The emission spectrum of $In_{0.835}Gd_{0.12}BO_3:Eu^{3+}_{0.045}$ is shown in FIG. 2A. The radiation in a wavelength interval from 590 to 600 nm in this spectrum accounts for at least 25% of the total power in the entire first wavelength region. More in particular, the power proportion thereof is more than 50%, in this case 64%. The ratio of the power proportion of the radiation in the wavelength interval from 600 to 620 nm to the power proportion of the radiation in the wavelength interval from 590 to 600 nm is 0.38, i.e. lies between the preferred limits of 0.2 and 1.0 mentioned above.

Figure 2B:
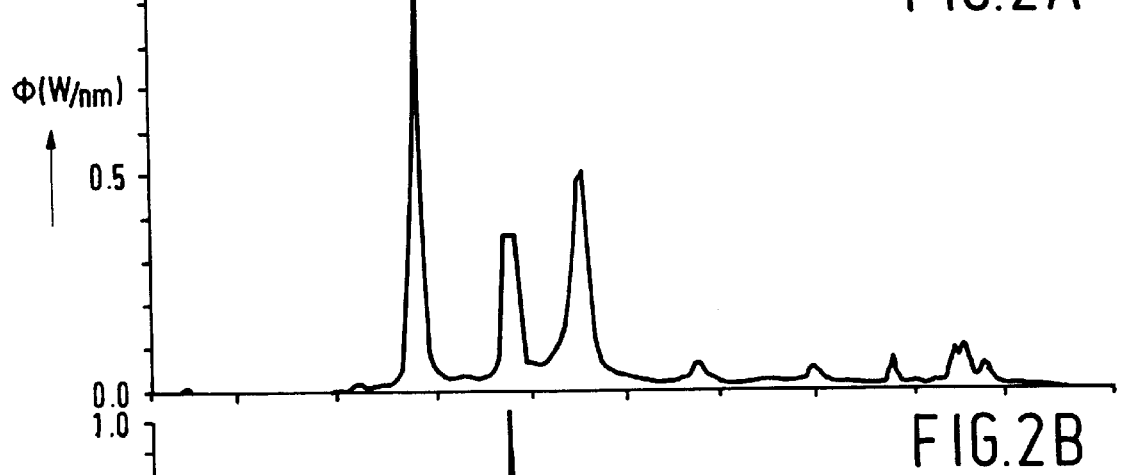
FIG. 2B shows the emission spectrum of gadolinium borate activated by bismuth and europium.

In a modification of this embodiment, the luminescent layer of the lamp comprises the luminescent material $Gd_{0.945}Bi_{0.005}BO_3:Eu^{3+}_{0.05}$ for emission in the first wavelength region. The emission spectrum of this material is shown in FIG. 2B. The proportional power of radiation in a wavelength interval from 590 to 600 nm of this emission spectrum accounts for 32% of the power in the entire first wavelength region.

Figure 2C:
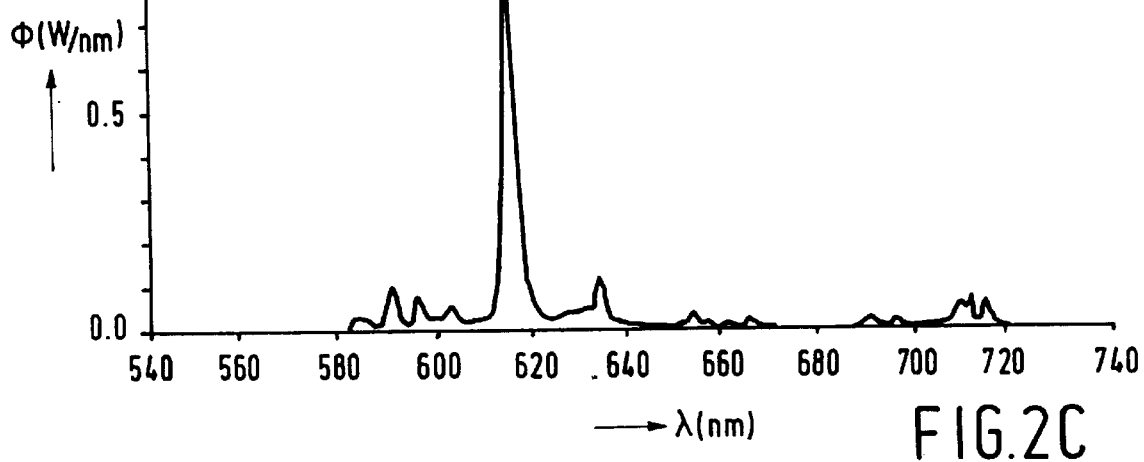
FIG. 2C shows the emission spectrum of YOX.

The luminescent layer in a lamp not according to the invention comprises exclusively the luminescent material YOX for emission in the wavelength region 590 to 630 nm. The emission spectrum of YOX is shown in FIG. 2C. The proportion of the power of the radiation in the wavelength interval from 590 to 600 nm in this emission spectrum is no more than 9% of that of the radiation in the entire first wavelength region. The ratio of the proportion of the radiation power in the wavelength interval from 600 to 620 nm to the proportion of the radiation power in the wavelength interval from 590 to 600 nm is 8.47.

The visual efficiency of the radiation in the first wavelength region of the spectrum of the lamp of FIG. 1 is 343 lm/W. This is 17% more than that of the lamp not according to the invention in which exclusively the luminescent material YOX is used for emission in the first wavelength region. This latter material has a visual efficiency of 292 lm/W. The lamp according to the invention has a color rendering index of 65.5, which is even higher than that of a standard lamp.

Figure 3:
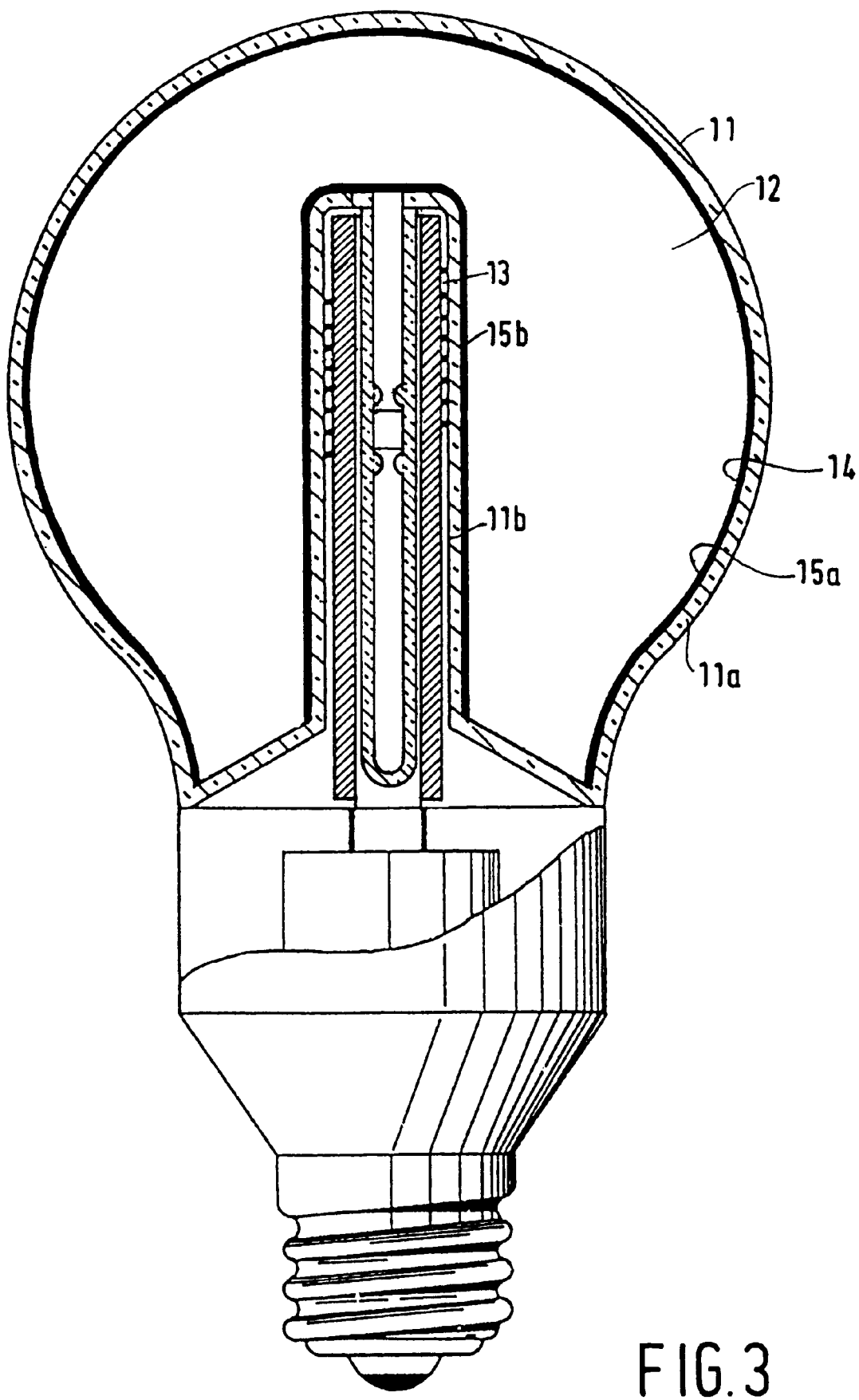
FIG. 3 shows a second embodiment of the low-pressure mercury discharge lamp according to the invention is shown in FIG. 3.

A second embodiment of the lamp according to the invention is shown in FIG. 3. Components in this Figure corresponding to those in FIG. 1 have reference numerals which are 10 higher. In FIG. 3, the discharge vessel 11 has an enveloping portion 11a and a recessed portion 11b. An electric coil 13 is accommodated in the recessed portion 11b and forms means for maintaining an electric discharge in the discharge vessel 11. In the embodiment shown, the luminescent layer has a first portion 15a on the enveloping portion 11a of the discharge vessel and a second portion 15b of the recessed portion 11b. The portions 15a, 15b may be of the same composition. Their compositions may alternatively differ, for example in that a luminescent material for emission in the third wavelength region is present exclusively in the luminescent layer of the enveloping portion. For the purpose of emission in the first wavelength region, luminescent material for emission in the wavelength interval from 590 to 600 nm may be provided, for example, in the first portion 15a of the luminescent material, while luminescent material for emission in the wavelength interval from 600 to 620 nm may be provided, for example, in the second portion 15b of the luminescent layer. In yet another modification, a layer of reflecting material is provided instead of or below the second portion 15b of the luminescent layer.

We claim:

1. A low-pressure mercury discharge lamp comprising a discharge vessel (1; 11) which encloses a discharge space (2; 12) in a gastight manner and in which a filling comprising mercury is accommodated, said lamp further comprising means (3a, 3b; 13) for maintaining an electric discharge in the discharge space, which discharge vessel is provided with a luminescent layer (5; 15a, 15b), and said lamp generating light during operation with a spectrum which is substantially composed of radiation in a first wavelength region from 590 to 630 nm, in a second wavelength region from 520 to 565 nm, and in a third wavelength region from 430 to 490 nm, wherein the radiation in a wavelength interval from 590 to 600 nm accounts for a proportional power of at least 50% of the total power radiated in the entire first wavelength region.

2. A low-pressure mercury discharge lamp as claimed in claim 1, wherein the radiation in a wavelength interval from 600 to 620 nm has a proportional power which lies between 0.2 and 1.0 times the proportional power of the radiation in the wavelength interval from 590 to 600 nm.

3. A low-pressure mercury discharge lamp as claimed in claim 1, wherein the luminescent layer for the emission of radiation in the first wavelength region comprises a luminescent material with a host lattice and an activator, which activator is formed by the $Eu^{3+}$ ion which is present in the host lattice in a location with inversion symmetry.

4. A low-pressure mercury discharge lamp as claimed in claim 3, wherein said luminescent material complies with the formula $$M1_xM2_{(1-x-y)}BO_3:Eu^{3+}_y,$$

in which M1 is selected from the group consisting of Sc, In and Lu, and in which M2 is selected from the group consisting of Sc, Y, La, Gd, Ga, In, and Lu, M1 being different from M2, with $0.01 \leq y \leq 0.2$, $x > 0$, $x+y < 1$, while the luminescent material has the calcite lattice structure.

5. A low-pressure mercury discharge lamp as claimed in claim 4, wherein M1 and M2 are formed by In and Gd, respectively.

6. a low-pressure mercury discharge lamp as claimed in claim 4, wherein $0.03 \leq y \leq 0.06$.

* * * * *